United States Patent [19]
Arioka et al.

[11] Patent Number: 4,666,754
[45] Date of Patent: May 19, 1987

[54] MAGNETIC RECORDING MEDIUM

[75] Inventors: Hiroyuki Arioka; Hideki Ishizaki; Toshiaki Ide, all of Saku, Japan

[73] Assignee: TDK Corporation, Tokyo, Japan

[21] Appl. No.: 746,639

[22] Filed: Jun. 20, 1985

[30] Foreign Application Priority Data

Jun. 26, 1984 [JP] Japan ................. 59-130127

[51] Int. Cl.$^4$ ............................ G11B 5/64; G11B 5/70
[52] U.S. Cl. ....................................... 428/141; 427/44; 427/131; 428/323; 428/694; 428/695; 428/900
[58] Field of Search ............... 428/694, 695, 900, 141, 428/323; 427/131, 44

[56] References Cited

U.S. PATENT DOCUMENTS

| 4,135,031 | 1/1979 | Akashi et al. | 427/131 |
| 4,425,404 | 1/1984 | Suzuki et al. | 428/695 |
| 4,452,863 | 6/1984 | Takizawa et al. | 428/695 |
| 4,486,500 | 12/1984 | Naruo et al. | 428/695 |
| 4,520,070 | 5/1985 | Yamamoto et al. | 427/131 |
| 4,526,833 | 7/1985 | Burguette et al. | 427/131 |

Primary Examiner—Paul J. Thibodeau
Attorney, Agent, or Firm—Oblon, Fisher, Spivak, McClelland & Maier

[57] ABSTRACT

A magnetic recording medium comprising a non-magnetic substrate, a magnetic recording layer formed on the substrate, and a top coating layer formed on the magnetic recording layer, wherein the top coating layer contains a fine particulate pigment at its surface, and the surface roughness (R20) of the top coating layer is less than 400 Å.

7 Claims, No Drawings

MAGNETIC RECORDING MEDIUM

BACKGROUND OF THE INVENTION

1. Field of the Invention

The present invention relates to a magnetic recording medium. More particularly, the present invention relates to a magnetic recording medium having excellent running stability and durability, and being less likely to bring about clogging and dropouts.

2. Description of the Prior Art

Recently, magnetic recording media have been widely used in the fields of audio and video recording, computers, magnetic discs, etc. Accordingly, the amount of information to be recorded on magnetic recording media increases year after year, and there is an increasing demand for the improvement of the recording density of magnetic recording media.

A non-binder type magnetic recording medium, i.e. a magnetic recording medium comprising a ferromagnetic thin film, has advantages over a coating type magnetic recording medium in that it can readily be made thin and it has great saturation magnetization. Nevertheless, it has some problems in respect of corrosion, impact strength and frictional strength, and is susceptible to abrasion or destruction due to its engagement with the magnetic head in high speed relative movement during the operation such as recording, playing back or erasing of magnetic signals. Namely, the magnetic recording medium with a ferromagnetic thin film formed by electroplating, electroless plating, sputtering, vacuum vapor deposition, ion plating, etc., contains no binder, and accordingly, the magnetic recording layer is likely to be abraded or destructed by friction during the sliding engagement with the magnetic head.

Further, the magnetic recording medium comprising a ferromagnetic thin film is likely to be corroded from its surface, and if the corrosion progresses, the practically desired properties such as head touch or abrasion resistance deteriorate, and the electromagnetic conversion characteristics will be adversely affected.

In order to overcome this difficulty, it has been proposed to apply a lubricant to the surface of the magnetic thin metal film (Japanese Examined Patent Publication No. 25246/1964). However, in such a method, the lubricating effect does not last as the lubricant is likely to be wiped off by e.g. the magnetic head. Further, such effects as rust-proofing effects or durability can not of course be expected by this method.

Further, as a means to provide a lubricating effect continuously on the magnetic recording layer, it has been proposed to provide a lubricating layer (i.e. a back coating layer) formed on the opposite side of the magnetic recording layer and comprising a liquid or semi-solid lubricant and an organic binder as main components (Japanese Examined Patent Publication No. 29769/1982). In this method, the lubricant exuding from the rear side surface of the magnetic recording layer transfers to the magnetic recording layer when the magnetic medium is wound in the form of a roll, whereby the lubricant can always be supplied to tne surface of the magnetic recording layer, and the durability (resistance against scratching or abrasion) or the dynamic frictional coefficient of the magnetic recording layer are said to be improved. However, in such a method wherein a lubricant is incorporated in the back coating layer without providing a top coating layer on the ferromagnetic thin film, the level of friction between the magnetic thin film and the magnetic head is still high, thus leading to a running failure, and the corrosion resistance or the rust-proofing effect is not adequate.

Also in the case of a coating type magnetic recording layer, it is known to provide a top coating layer in order to protect the magnetic layer. However, such a conventional top coating layer has a drawback that it is likely to be abraded.

The present inventors have conducted extensive researches to overcome the above difficulties, and have found and previously proposed that it is possible to obtain a magnetic recording medium having improved running property and durability, by providing a top coating layer comprising specific components on the surface of a magnetic recording layer (Japanese Patent Application No. 15258/1984 and No. 15259/1984). From a further research, the present inventors have now found that the above-mentioned conventional top coating layer is likely to be abraded, because it contains no fine particulate pigment, and thus has no head cleaning function. Further, they have found that it is possible to overcome the above drawback and obtain an excellent magnetic recording medium having stability with a minimum possibility of clogging, level down and dropout when the top coating layer contains a fine particulate pigment at its surface and the surface roughness (R20) of the top coating layer is less than 400 Å. The present invention has been accomplished on the basis of these discoveries.

SUMMARY OF THE INVENTION

Thus, the present invention provides a magnetic recording medium comprising a non-magnetic substrate, a magnetic recording layer formed on the substrate, and a top coating layer formed on the magnetic recording layer, wherein the top coating layer contains a fine particulate pigment at its surface, and the surface roughness (R20) of the top coating layer is less than 400 Å.

DETAILED DESCRIPTION OF THE INVENTION

By forming a top coating layer on a coating type magnetic layer, it is possible to improve the frictional effects, abrasion resistance and durability. Whereas, when a top coating layer is formed on a ferromagnetic thin film, it is possible to obtain a magnetic recording medium having excellent rust-proofing properties, corrosion resistance, durability and running stability. However, when the magnetic recording medium having a top coating layer is used repeatedly, the abraded matters from the top coating layer are likely to deposit and accumulate on the magnetic head, whereby clogging, level down or dropouts are likely to result. This tendency is remarkable particularly in a magnetic recording medium containing no fine particulate pigment. If a fine particulate pigment is incorporated, the fine particulate pigment serves as abrasives and scrapes off the matters deposited on the head, thus cleaning the head, whereby the clogging and level down can be prevented, and dropouts can be reduced.

It has been found that in such a case, good results can be obtained when the surface roughness R20 ($R_{max}$ value as measured by Talystep method of TAYLOR-HOBSON Co. by means of a needle of 0.1×2.5 μm under a needle pressure of 2 mg and with a cut off of 0.17 mm) of the top coating layer is less than 400 Å, preferably from 20 to less than 400 Å. If the surface roughness is less than 20 Å, the contact with the head tends to be too good that no adequate cleaning effects will be obtained and the friction tends to increase. If the surface roughness is 400 Å or more, the surface tends to be too rough and is likely to be abraded, whereby dropouts are likely to result. A more preferred range is less than 200 Å.

The following methods may be employed to bring the surface roughness to a level of from 20 to less than 400 Å.

1. A top coating is applied, and, after passing through a drying furnace, cured by electron beams or ultraviolet rays.

2. A top coating is applied, and, without passing through a drying furnace, cured by electron beams or ultraviolet rays.

3. A top coating is applied under heating while it is highly viscous.

4. In the above process 1 or 2, the top coating after or without passing through a drying furnace, is subjected to calendering in a non-cured state, and thereafter cured by electron beams or ultraviolet rays.

5. In the above process 4, the top coating after or without passing through a drying furnace, semi-cured at a low radiation dose (from 0.01 to 2 Mrad), thereafter subjected to calendering, and then cured by electron beams or ultraviolet rays.

6. In any one of the above processes 1 to 5, a calendering step may be added at the final stage.

Further, when an antioxidant and at least one member from monomers, oligomers and polymers, are incorporated into the top coating layer, the antioxidant serves to improve adsorbing properties of the top coating layer to the magnetic layer, whereby the peeling or abrasion of the top coating layer is minimized, whereas said at least one member of monomers, oligomers and polymers, serves to render the bonding strength to the magnetic layer by means of the antioxidant uniform, whereby fine irregularities are eliminated, and the stability during the high temperature running operation is improved.

Thus, the running stability particularly under high temperature and high humidity conditions will be improved, and the deposition to the head and the abrasion of the top coating layer will be minimized, and the frictional effects will be stabilized.

As the fine particulate pigment to be used in the present invention, there may be mentioned, for instance, $ZrO_2$, $Cr_2O_3$, $Al_2O_3$, $Y_2O_3$, $CeO_2$, $Fe_3O_4$, $Fe_2O_3$, $ZrSiO_4$, $Sb_2O_5$, $SnO_2$ and $TiO_2$.

The particle sizes of these fine particulate pigments are less than 200 Å, preferably at most 150 Å. If the particle size of the fine particulate pigment is 200 Å or more, the spacing loss increases, the output fluctuations likewise increase, the irregularities of the fine particulate pigment in the top coating layer tend to be distinct, and image irregularities or distortions are likely to be led, thus adversely affecting the image.

In the case of $SiO_2$, the fine particulate pigment is available in the form of (1) a colloidal solution of super-fine particles of silicic anhydride (Snowtex (trademark), an aqueous system, a methanol silica sol, etc., manufactured by Nissan Chemical Industries, Ltd.) or (2) super-fine particulate anhydrous silica (Standard product: 100 Å) produced by burning purified silicon tetrachloride (Aerosil (trademark), manufactured by Nippon Aerosil Co., Ltd.).

Further, it is possible to use super-fine particulate aluminum oxide and titanium oxide which can be produced by a vapour phase method in the same manner as for the above-mentioned colloidal solution of super-fine particles (1) and the super-fine particulate anhydrous silica (2), as well as the above-mentioned fine particulate pigments.

The top coating layer of the present invention may contain, in addition to the above-mentioned antioxidant and organic binder such as a monomer, oligomer or polymer (the organic binder may not necessarily be incorporated), other additives, such as lubricants, which are commonly added to the top coating layer of this type.

Further, carbon black may be incorporated into the top coating layer to prevent dropout. Such carbon black preferably has a particle size of less than 200 Å.

As the carbon black to be used for the back coating layer of the present invention, there may be employed any carbon black produced by any one of conventional methods, such as furnace, channel, acetylene, thermal or lamp. However, acetylene black, furnace black, channel black, roller and disc black and German naphthalene black are preferred. The particle size of the carbon black to be used in the present invention is preferably less than 200 Å, as measured by an electron microscopic photography.

As the antioxidant to be used for the top coating layer of the present invention, there may be employed any antioxidant so long as it is capable of preventing the oxidation of a metal. The following conventional antioxidants may be employed. Namely, they are structurally classified into (1) phenolic antioxidants, (2) amine antioxidants, (3) phosphorus antioxidants, (4) sulfur antioxidants, (5) organic acid, alcohol or ester antioxidants, (6) quinone antioxidants, and (7) inorganic acid and inorganic salt antioxidants.

Specific Examples of these antioxidants may be mentioned as follows:

(1) As phenolic antioxidants, there may be mentioned 2,6-di-tert-butyl-p-cresol, 2,6-di-tert-butyl-phenol, 2,4-di-methyl-6-tert-butyl-phenol, butylhydroxy anisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetraquis[methylene-3-(3,5-di-tert-butyl-4-hydroxyphenyl)propionate]methane, 1,1,3-tris(2-methyl-4-hydroxy-5-tert-butylphenyl)butane, dibutylhydroxytoluene, propyl gallate, guaiaretic acid, and nordihydroguaiaretic acid. As a radiation curable type, there may be mentioned a methacrylate or acrylate type of monoglycol salicylate, 2,5-di-tert-butylhydroquinone, 2,4-dihydroxybenzophenone, 2,4,5-trihydroxybutyrophenone or hydroquinone.

(2) As amine antioxidants, there may be mentioned phenyl-$\beta$-naphtylamine, $\alpha$-naphthylamine, N,N'-di-secondarybutyl-p-phenylenediamine, phenothiazine, N,N'-diphenyl-p-phenylenediamine as well as alkanol amines and phospholipids. The amine antioxidants include radiation curable type such as radiation curable dimethylamino ethylmethacrylate or acrylate.

(3) As phosphorus antioxidants, radiation curable or radiation non-curable type may be employed. R as the phosphoric acid ester moiety includes an alkyl group, an alkyl phenyl group as well as oxidized ethylene and oxidized propylene, and R preferably contains from 1 to 26 carbon atoms, more preferably from 1 to 22 carbon atoms. The phosphoric acid esters include mono-, di- or tri-esters. The antioxidant may contain substantial amount of the mono- or di- component, and the tri-type may be cut. Further, phosphoric acid esters include NH$_4$-type, methacrylate-type and acrylate-type. Specifically, there may be mentioned phosphites such as triphenyl phosphite, trioctadecyl phosphite, tridecyl phophite and trilauryl trithio phosphite; and phosphate such as hexamethyl phosphoric triamide, butylphosphate, cetylphosphate, butoxyethyl phosphate, 2-ethylhexyl phosphate, β-chloroethyl phosphate, butoxyethyl phosphate diethylamine salt, di(2-ethylhexyl)phosphate, ethylene glycol acid phosphate, (2-hydroxyethyl)methacrylate phosphate, butylhydroxymethacrylate phosphate, caprylhydroxymethacrylate phosphate, myristylhydroxymethacrylate phosphate, stearylhydroxymethacrylate phosphate, cetylhydroxymethacrylate phosphate, butylphenylhydroxymethacrylate phosphate, amylphenylhydroxymethacrylate phosphate and nonylphenylhydroxymethacrylate phosphate as well as acrylate types thereof, phenyl phosphate, and phenyl phosphates of other alcohols and nonylphenyl, and vanadium type acidic phosphoric acid esters.

(4) As sulfur antioxidants, there may be mentioned dilauryl thiodipropionate, distearyl thiodipropionate, laurylstearyl thiodipropionate, dimyristyl thiodipropionate, distearyl β,β'-thiodibutylate, 2-mercaptobenzimidazole, and dilauryl sulfide. They also include radiation curable type such as methacrylates and acrylates of 4,4'-thio-bis(3-methyl-6-tert-butylphenol), and 2,2'-thio-bis(4-methyl-6-tert-butylphenol). Further, these antioxidants may further contain oxidized ethylene or oxidized propylene.

(5) The organic acid, alcohol or ester antioxidants include sorbitol, glycerine, propylene glycol, adipic acid, citric acid and ascorbic acid, and they may be of radiation curable type.

(6) As quinone antioxidants, there may be mentioned hydroquinone and tocopherol. They may be of radiation curable type.

(7) Phosphoric acid may be mentioned as the representative of the inorganic acid or inorganic salt antioxidants.

Among the above-mentioned antioxidants, it is preferred to employ, with a view to preventing the transfer of the rear side roughness to the ferromagnetic thin film, a radiation curable type having an acrylic double bond in its molecule, such as monoglycol salicylate methacrylate (or acrylate), 4-tert-butylcatechol methacrylate (or acrylate), dimethylaminoethyl methacrylate (or acrylate), ethylhydroxy methacrylate (or acrylate) phosphate, cetylhydroxyphosphate methacrylate (or acrylate), stearyl methacrylate (or acrylate) phosphate, and phenyl types thereof, and 2,2'-thio-bis(4-methyl-6-tert-butyl-phenol) methacrylate (or acrylate). The phosphoric acid esters may be prepared by conventional methods. For instance, there may be mentioned a method disclosed in Japanese Unexamined Patent Publication No. 44223/1982. When a radiation curable antioxidant is employed, its curing onto the ferromagnetic thin film can be conducted on-line, whereby deterioration of the surface properties due to the transfer of the rear side roughness caused by the tightening of the winding during the thermosetting can be avoided, and there will be no decrease in the output. In addition to the effects on the properties such as the prevention of dropouts and the reduction of the difference in the output as between the inside and outside portions of the rolled medium, it is possible to obtain effects on the process such that the production can be conducted on-line.

As the lubricant to be used, there may be employed e.g. silicone oil, fluorine oil, a fatty acid, a fatty acid ester, a paraffin, a liquid paraffin or a surfactant as a lubricant which has been commonly used for the magnetic recording medium of this type. However, it is preferred to use a fatty acid and/or a fatty acid ester.

As the fatty acid, there may be mentioned a fatty acid having at least 12 carbon atoms (RCOOH where R is an alkyl group having at least 11 carbon atoms) such as caprylic acid, capric acid, lauric acid, myristic acid, palmitic acid, stearic acid, behenic acid, oleic acid, elaidic acid, linolic acid, linolenic acid or stearolic acid. As the fatty acid ester, there may be employed a fatty acid ester of a monobasic fatty acid having from 12 to 16 carbon atoms with a monohydric alcohol having from 3 to 12 carbon atoms or a fatty acid ester of a monobasic fatty acid having at least 17 carbon atoms with a monohydric alcohol having carbon atoms in a total of from 21 to 23 as added with the number of carbon atoms of the fatty acid. Further, metallic soaps of the above-mentioned aliphatic acids with alkali or alkaline earth metals and lecithin may also be used.

As the silicone, there may be employed a fatty acid-modified silicone or a partially fluorinated silicone may be employed. As the alcohol, there may be employed a higher alcohol. As the fluorine oil, there may be employed those produced by electrolytic substitution, telomerization or oligomerization.

Among the lubricants, radiation curable type lubricants may be advantageously employed to prevent the transfer of the roughness of the rear side to the ferromagnetic thin layer or to reduce dropouts or the difference in the output as between the outside and the inside of the roll of a rolled tape, and to make the production on-line possible. Such radiation curable lubricants include compounds containing in their molecules molecular chains exhibiting lubricating properties and acrylic double bonds, such as acrylates, methacrylates, vinyl acetates, acrylic acid amide compounds, vinyl alcohol esters, methyl vinyl alcohol esters, allyl alcohol esters and glycerides. These lubricants may be represented by the following structural formulas:

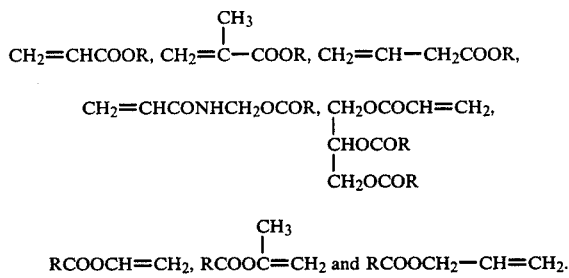

In the above formulas, R is a straight chain or branched, saturated or unsaturated hydrocarbon group having at least 7 carbon atoms, preferably from 12 to 23 carbon atoms, which may be substituted by fluorine. As the fluorinated substituents, there may be mentioned $C_nF_{2n+1}-$, $C_nF_{2n+1}(CH_2)_m-$ (where m = 1-5),

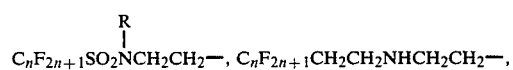

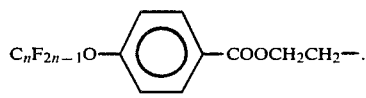

Preferred specific examples of such radiation curable lubricants include stearic acid methacrylate or acrylate, methacrylate or acrylate of stearyl alcohol, methacrylate or acrylate of glycerin, methacrylate or acrylate of glycol, and methacrylate or acrylate of silicone.

As the polymer for the top coating layer of the present invention, there may be employed thermoplastic resins, thermosetting resins or reactive resins, or mixtures thereof, which are commonly used for the magnetic recording media. However, from the viewpoint of the strength of the formed coating layer, a curable type resin, particularly radiation curable resin is preferred.

As the thermoplastic resins, there may be employed those having a softening point of at most 150°C., an average molecular weight of from 10,000 to 200,000 and a degree of polymerization of from about 200 to 2,000. For instance, there may be mentioned a vinyl chloride-vinyl acetate copolymer (including the one containing a carboxylic acid), a vinyl chloride-vinyl acetate-vinyl alcohol copolymer (including the one containing a carboxylic acid), a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, a polyvinyl fluoride, a vinylidene chloride-acrylonitrile copolymer, a butadiene-acrylonitrile copolymer, a polyamide resin, a polyvinylbutyral, a cellulose derivative (such as cellulose acetate, cellulose diacetate, cellulose triacetate, cellulose propionate or nitrocellulose), a styrene-butadiene copolymer, a polyester resin, a chlorovinyl ether-acrylate copolymer, an amino resin, a synthetic rubber-type thermoplastic resin, or a mixture thereof.

As the thermosetting resins or reactive resins, there may be employed those which have a molecular weight of at most 200,000 in the state of the coating solutions and which undergo, when heated after being applied and dried, a condensation or addition reaction to have an unlimited molecular weight. Among these resins, those which do not soften or melt until the thermal decomposition, are preferred. Specifically, there may be mentioned, for instance, a phenol resin, an epoxy resin, a polyurethane thermosetting resin, a urea resin, a melamine resin, an alkyd resin, a silicone resin, an acrylic reactive resin, an epoxy-polyamide resin, a nitrocellulose melamine resin, a mixture of a high molecular weight polyester resin with an isocyanate prepolymer, a mixture of methacrylate copolymer with a diisocyanate prepolymer, a mixture of a polyester polyol with a polyisocyanate, a urea formaldehyde resin, a mixture of a low molecular weight glycol/a high molecular weight diol/triphenylmethane triisocyanate, a polyamine resin or a mixture thereof.

Particularly preferred is a thermosetting resin which is a combination of a cellulose resin (e.g. nitrocellulose), a vinyl chloride-vinyl acetate-vinyl alcohol copolymer and urethane (wherein a curing agent is used), or a radiation curable resin which is composed of a vinyl chloride-vinyl acetate-vinyl alcohol copolymer (including the one containing a carboxylic acid) or an acryl-modified vinyl chloride-vinyl acetate-vinyl alcohol copolymer (including the one containing a carboxylic acid) and a urethane acrylate. As the radiation curable resin, there may be employed, in addition to the above-mentioned preferred combination, a thermoplastic resin which contains in its molecule or is incorporated with radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative. As other useful binder components, there may be mentioned acrylic acid, methacrylic acid and acrylamide as monomers. A binder containing double bonds may also be obtained by modifying various polyesters, polyols, polyurethanes or the like with a compound having an acrylic double bond. Further, it is also possible to obtain resins having various molecular weights by incorporating a polyhydric alcohol and a polybasic carboxylic acid, as the case requires. The above-mentioned specific examples are only a part of useful radiation sensitive resins, and they may be used in combination as a mixture.

As the radiation curable monomer, radiation curable oligomer and radiation curable polymer to be used for the top coating layer of the present invention, there may be mentioned ionization energy sensitive monomers, oligomers and polymers which contain in their molecules radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative.

As the radiation curable monomer, there may be employed a compound having a molecular weight of less than 2,000. Likewise, as the radiation curable oligomer, there may be employed a compound having a molecular weight of from 2,000 to 10,000. As such monomer and oligomer, there may be mentioned styrene, ethyl acrylate, ethylene glycol diacrylate, ethylene glycol dimethacrylate, diethylene glycol diacrylate, diethylene glycol dimethacrylate, 1,6-hexane glycol diacrylate, 1,6-hexane glycol dimethacrylate, etc. Particularly preferred are N-vinyl pyrrolidone, pentaerythritol tetraacrylate (or methacrylate), pentaerythritol triacrylate (or methacrylate), trimethylol propane triacrylate (or methacrylate), trimethyl propane diacrylate (or methacrylate), a multifunctional oligoester acrylate (Acronix M-7100, M-5400, 5500, 5700, etc. manufactured by Toa Gosei Chemical Industries Co. Ltd.), an acryl-modified urethane elastomer (Nippolan 4040), or such monomers to which functional groups such as —COOH, are introduced, an acrylate (or methacrylate) of a phenol ethylene oxide adduct, or compounds of the following formula in which a pentaerythritol condensed ring is substituted by an acryl radical (or a methacryl radical) or an ε-caprolactone-acryl radical:

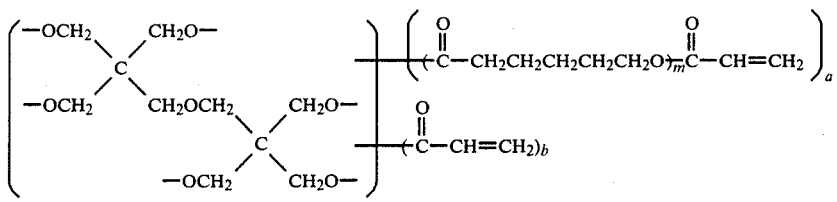

i.e. a compound wherein m=1, a=2 and b=4 (which will hereinafter referred to as "special pentaerythritol condensation product A"), a compound wherein m=1, a=3 and b=3 (which will be hereinafter referred to as "special pentaerythritol condensation product B"), a compound wherein m=1, a=6 and b=0 (which is hereinafter referred to as "special pentaerythritol condensation product C"), a compound wherein m=2, a=6 and b=0 (which will be hereinafter referred to as "special pentaerythritol condensation product D"), and special acrylates represented by the following formulas:

$$(CH_2=CHCOOCH_2)_3-CCH_2OH \qquad (1)$$
(Special Acrylate A)

$$(CH_2=CHCOOCH_2)_3-CCH_2CH_3 \qquad (2)$$
(Special Acrylate B)

$$[CH_2=CHCO(OC_3H_6)_n-OCH_2]_3-CCH_2CH_3 \qquad (3)$$
(n ≈ 3) (Special Acrylate C)

(4)

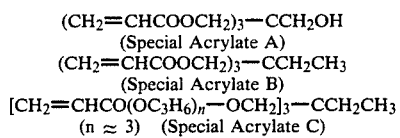
(Special Acrylate D)

(5)

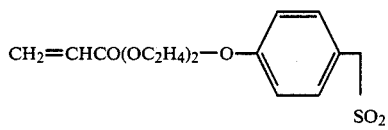
(Special Acrylate E)

(6)

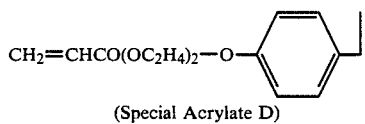
(Special Acrylate F)

(7)

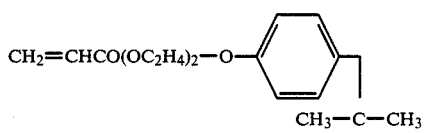
(n ≈ 16) (Special Acrylate G)

$$CH_2=CHCOO-(CH_2CH_2O)_4-COCH=CH_2 \qquad (8)$$
(Special Acrylate H)

(9)

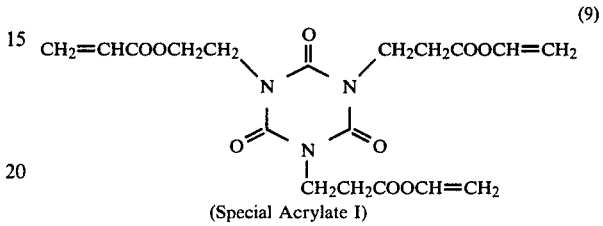
(Special Acrylate I)

(10)

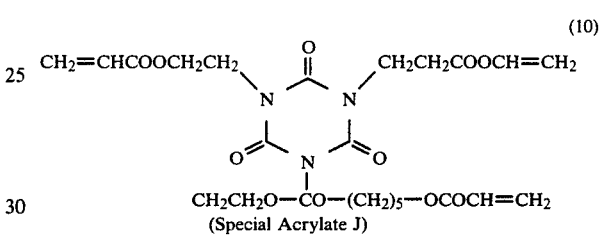
(Special Acrylate J)

$$A-(X-Y)_n X-A \qquad (11)$$
$\phantom{AAA}|\phantom{AAAAA}|$
$\phantom{AAA}A\phantom{AAAAA}A$ A: acrylic acid, X: polyhydric alcohol, Y: polybasic acid
(Special Acrylate K)

Further, as a radiation curable oligomer, there may be mentioned a polyfunctional oligoester acrylate represented by the following formula, or an acryl modified urethane elastomer, or such oligomers to which functional groups such as -COOH, are introduced:

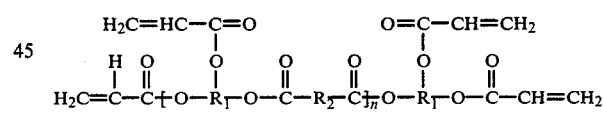

where $R_1$, $R_2$ an alkyl group, and n: an integer.

By using at least one organic binder from the abovementioned monomers, oligomers and polymers, the top coating layer can be reinforced, and the breaking strength of the coating layer increases, whereby the coating layer will be strengthened, the top coat abrasion will be minimized, and the running properties under high temperature and high humidity conditions will be stabilized. Thus, it is possible to obtain a magnetic recording medium with minimum dropouts, which is less likely to adhere to the head, and less susceptible to top coat abrasion and which has stabilized frictional effects. Further, by using a radiation curable binder, continuous treatment for the production of the top coating layer is possible and can be conducted on-line, thus contributing to energy saving and cost saving.

The fine particulate pigment is incorporated in the top coating layer in an amount of from 15,000 to 1,000,000 particles/100 $\mu m^2$, preferably from 20,000 to 800,000 particles/100 $\mu m^2$.

As the upper limit of the thickness of the top coating layer is 450 Å from the aspect of the electromagnetic conversion characteristics, the antioxidant may be applied onto the top coating layer to such an extent that the top coating layer has a thickness of from 5 to 450 Å.

By virtue of the presence of the antioxidant, the bonding properties to the magnetic recording layer become strong, and the abrasion, clogging, level down or dropouts will be minimized.

Particularly, when the antioxidant is applied onto a ferromagnetic thin film, the rust-proofing effect increases, corrosion seldom develops, the layer scarecely receives damages, and the electromagnetic conversion characteristics will be improved.

The ratio of the organic binder such as the above monomer, oligomer or polymer to the antioxidant is from 0:100 to 90:10, preferably from 0:100 to 70:30 (by weight). The lubricant is used in an amount of from 0.5 to 300 parts by weight per 100 parts by weight of the organic binder + the antioxidant.

In the present invention, by virtue of the presence of the organic binder, it is possible to obtain a uniform bonding strength of the antioxidant to the magnetic layer, and the abrasion, clogging, level down or dropouts can be minimized.

Carbon black is used in a ratio of carbon black to the fine particulate pigment of from 1/9 to 8/2, preferably from 1/9 to 5/5.

The thickness of the top coating layer is preferably from 5 to 800 Å. If the thickness is too great, the electromagnetic conversion characteristics are likely to deteriorate, or abrasion is likely to be led. On the other hand, if the thickness is too small, clogging is likely to result. In the case of a ferromagnetic thin film, the thickness of the top coating layer is preferably at most 450 Å. The surface roughness of the ferromagnetic thin film without a top coating is preferably at most 100 Å, and it has been found that in case a top coating layer is formed thereon, if the thickness of the top coating is too great, abrasion is likely to be led. On the other hand, if the thickness is too small, clogging is likely to result, since the adhesion of the top coating layer tends to be too weak. Such facts have been discovered for the first time by the present invention. In particular, a preferred range is from 5 to 450 Å, and a range of from 10 to 300 Å is particularly preferred.

As the magnetic layer of the present invention, there may be employed a coating type composed of a coating layer comprising fine ferromagnetic particles and a binder, or a thin metal film type composed of a thin layer of ferromagnetic metal. As the ferromagnetic material, there may be mentioned $\gamma$-$Fe_2O_3$, $Fe_3O_4$, Co-doped $\gamma$-$Fe_2O_3$, Co-doped $\gamma$-$Fe_2O_3$-$Fe_3O_4$ solid solution, Co compound-adsorbed $\gamma$-$Fe_2O_3$, Co compound-adsorbed $Fe_3O_4$ (inclusive of an intermediately oxidized state with $\gamma$-$Fe_2O_3$; the Co compound here is meant for e.g. cobalt oxide, cobalt hydroxide, cobalt ferrite or cobalt ion-adsorbed substance, whereby the magnetic anisotropy of cobalt is utilized for the improvement of the coercive force), or iron, cobalt, nickel, other ferromagnetic metal or a magnetic alloy such as Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb Mn-Al, Fe-Co-Cr or Co-Ni-Cr. Further, a ferrite magnetic substance such as Ba ferrite or Sr ferrite may be mentioned.

Heretofore, there have been commonly used as the ferromagnetic powder, for instance, $\gamma$-$Fe_2O_3$, Co-containing $\gamma$-$Fe_2O_3$, $Fe_3O_4$, Co-containing $Fe_3O_4$ or $CrO_2$. However, the magnetic characteristics such as the coercive force and the maximum residual magnetic flux density of these ferromagnetic powders, are inadequate for high sensitivity high density recording, and they are not suitable for use for magnetic recording of a signal having a short recording wavelength of a level of at most about 1 $\mu$m or for the magnetic recording with a narrow track width.

As the requirements for the magnetic recording media have become severe, there have been developments in or proposals for ferromagnetic powders having characteristics suitable for high density recording. Such ferromagnetic powders include metals or alloys such as Fe, Co, Fe-Co, Fe-Co-Ni or Co-Ni, and alloys thereof with Al, Cr or Si. For the purpose of high density recording, the magnetic recording layer using such an alloy powder is required to have a high coercive force and a high residual magnetic flux density. Therefore, it is desirable that various methods for the production or alloy compositions are selected to meet these requirements.

In respect of the magnetic alloy powder, the present inventors have prepared magnetic recording media by employing various alloy powders, and have found that a magnetic recording medium with a noise level being sufficiently low and suitable for high density short wave recording is obtainable when the specific surface area as measured by BET method is at least 48 $m^2/g$, the coercive force of the magnetic layer is at least 1000 Oe, and the surface roughness of the magnetic layer is at most 0.08 $\mu$m as a $R_{20}$ value (an average value of 20 values) with a cut off of 0.17 mm by Talystep method. When such a magnetic layer is combined with the top coating layer of the present invention, the cinching phenomenon (the loosening of the tape winding when the tape has been stopped abruptly), dropouts and abrasion can be reduced. Further, there is a trend that as the base for the magnetic tape, a plastic film made of e.g. polyethylene terephthalate, polyethylene naphthalate, polyimide or polyamide has a thickness as thin as about 11 $\mu$m or less, and accordingly there is an increasing tendency for greater tightening of the tape winding, thus leading to the transfer of the surface roughness of the back coating surface, if any, to the magnetic layer and the consequential decrease in the output. Such drawbacks are also overcome by the above-mentioned combination of the magnetic recording layer and the top coating layer according to the present invention. Further, when a ferromagnetic metal is used as the major component of the ferromagnetic material, it is likely that the electric resistance of the layer is high, and dropouts are likely to result, and accordingly it is necessary to take a certain antistatic measure. However, such a problem can also be solved by the combination with the top coating layer of the present invention. Thus, it is possible to advantageously use such a magnetic powder.

The preferred range of the coercive force of the above-mentioned magnetic recording layer is from 1,000 to 2,000 Oe. If the coercive force exceeds this range, the magnetic head tends to be saturated at the time of recording, or it becomes difficult to erase the magnetization. In general, the greater the specific surface area of the magnetic powder, the more the S/N ratio will be improved. However, if the specific surface area is too large, the dispersibility of the magnetic powder into the binder tends to be poor, or the effectiveness tends to be saturated. On the other hand, the surface roughness of the magnetic recording layer affects the recording sensitivity. If the surface roughness is small, the recording sensitivity for a short wavelength will increase.

As a ferromagnetic alloy satisfying the above characteristics, there may be employed a fine powder of Co, Fe-Co, Fe-Co-Ni or Co-Ni, or such a fine powder mixed with Cr, Al or Si. It may be a fine powder obtained by wet-reducing a metal salt with a reducing agent such as $BH_4$, a fine powder obtained by coating the surface of iron oxide with a Si compound and dry-reducing the product in $H_2$ gas, or a fine powder obtained by evaporating an alloy in a low pressure argon atmosphere, and it has an axial ratio of from 1:5 to 1:10 and a residual magnetic flux density Br of from 2,000 to 3,000 gauss, and satifies the above-mentioned conditions for the coercive force and the specific surface area.

Various binders may be employed in combination with the alloy magnetic powder to prepare magnetic coating compositions. It is usually preferred to employ a thermosetting resin binder or a radiation curable binder. As other additives, there may be employed a dispersant, a lubricant or an antistatic agent in accordance with the conventional method. Since there is a problem in the dispersibility because of the employment of the magnetic powder having a BET specific surface area of at least 48 $m^2/g$, it is advisable to employ a surfactant or an organic titanium coupling agent or a silane coupling agent as the dispersant. As the binder, there may be employed a binder comprising a vinyl chloride-vinyl acetate-vinyl alcohol copolymer, a polyurethane prepolymer and a polyisocyanate, such a binder which further contains nitrocellulose, other known thermosetting binders, or a radiation curable binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is then coated on a substrate such as a polyester base film and then subjected to thermosetting or radiation curing to form a magnetic layer, and further subjected to calender treatment.

In a case where a radiation curable binder is used, a continuous curing is possible, and no transfer of the roughness of the rear side to the magnetic layer is likely to take place, whereby dropouts can be prevented. Besides, the radiation curing can be conducted on-line, thus serving for the energy saving and manpower saving for the production, which in turn results in the reduction of the costs. From the property point of view, it is possible not only to prevent dropouts due to the tightening of the winding during the heat curing operation but also to prevent the difference in the output in the longitudinal direction of the magnetic tape attributable to the difference in the pressure of t4he respective portions in the direction of radius of the rolled tape. When the base thickness is as thin as 11 $\mu$m or less and the surface hardness of the magnetic layer is small as the hardness of the metal magnetic powder is smaller than the magnetic oxide such as $\gamma$-$Fe_2O_3$, the magnetic recording medium is susceptible to the influence of the tightening of the tape winding. However, by means of the radiation-cured back coating layer, this adverse effect can be eliminated, and the output difference as between the outside and the inside of the wound tape, or the difference in the dropouts can be eliminated. Thus, it is particularly preferred to employ a radiation curable binder for the back coating layer.

As the ferromagnetic metal or the ferromagnetic alloy to be used for the ferromagnetic thin film of the present invention there may be mentioned iron, cobalt, nickel, other ferromagnetic metal or a magnetic alloy such as Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb, Mn-Al, Fe-Co-Cr, or Co-Ni-Cr.

The ferromagnetic thin film is formed on a non-magnetic substrate, i.e. a known substrate e.g. a plastic film such as polyester film or a polyamide film, a metal plate such as an aluminum plate or a stainless steel plate, or an inorganic plate such as a glass plate, directly or with an interposed non-magnetic thin film layer, by applying the above-mentioned metal or alloy by means of vacuum vapor deposition, sputtering, ion plating, plating or any other method.

The ferromagnetic thin film of the present invention may be the one produced by any one of the above methods. However, rather than the one formed by (1) the vapor deposition in a vacuum of $5.0 \times 10^{-6}$ Torr at an angle of 50° in the direction of the width relative to the evaporation source, as described in Example 5 of the above-mentioned Japanese Examined Patent Publication No. 29769/1982, it is preferred to use the one obtained by (2) the vapor deposition under $1 \times 10^{-4}$ Torr which is commonly employed and in which the direction of the vapor deposition is inclined in the longitudinal direction (at an angle of 90° to 30°) and the vapor deposition is conducted while supplying $O_2$ or $O_2$ and Ar as the atmosphere.

The vapor deposited film produced by the above method (1) is in the metallic state over the entire surface (except for the portion naturally oxidized upon exposure to the air), whereas in the case of the method (2) wherein a metal or alloy is vapor deposited in vacuum in the presence of a very small amount of oxygen gas, the magnetic metal contains oxygen, and the oxygen is present in the state of an oxide without forming a solid solution with the metal. The presence of this oxide is preferable for the magnetic recording medium. It has been found that good properties in the present invention are obtainable particularly when the oxide is present in a large amount at the interface with the base and at the surface on the opposite side of the base.

For the introduction of oxygen into the ferromagnetic thin metal layer, there may be mentioned, in addition to the above-mentioned vapor deposition in the presence of oxygen, a method wherein a vapor deposited layer formed by a vacuum vapor deposition in the absence of oxygen, is forcibly oxidized, for instance, in an atmosphere at 90° C. under a relative humidity of 20% so that the surface on the opposite side of the base will be composed solely of an oxide. The oxygen content in the oxygen-containing ferromagnetic thin film is from 3 to 60% at (O/magnetic metal)$\times$100.

As a method for providing a top coating layer comprising the fine particulate pigment, at least one of the monomer, oligomer and polymer, the antioxidant, the lubricant, etc., on the surface of the magnetic recording layer, there may be employed a method wherein the above additives are diluted with a solvent and applied onto the surface of the magnetic layer to form a thin layer or such additives are mixed with a binder and then applied onto the thin film to form a thin layer, or a method wherein the above additives are vaporized in air, in an inert gas or in vacuum, and their vapors are brought in contact with the surface of the magnetic layer.

In the case where a radiation curable type additive is used for the magnetic layer or the top coating layer of the present invention, as the active energy rays to be used for the crosslinking thereof, there may be employed electron beams generated from a radiation accelerator as the source of radiation, $\gamma$-rays generated from $Co^{60}$ as the source of radiation, $\beta$-rays generated from $Sr^{90}$ as the source of radiation, or X-rays generated from X-ray generator as the source of radiation, or ultraviolet rays.

From the viewpoints of the easy control of the absorption dose, the introduction to the production line, or the shielding of ionized radiation, it is particularly advantageous to use the radiation rays from the radiation accelerator as the source of radiation.

In the present invention, a back coating layer is not essential. However, it is preferred to provide a back coating layer since the running properties will thereby be further stabilized. The back coating layer contains an inorganic pigment, a lubricant and an organic binder which are commonly employed.

As described in the foregoing, according to the present invention, the surface roughness (R20) of the top coating layer formed on a magnetic recording layer and containing a fine particulate pigment, is adjusted to be less than 400 Å, whereby such effects as low friction and minimum abrasion can be attained in addition to the excellent rust-proofing properties, corrosion resistance, durability and running stability attributable to the provision of the top coating layer. By virtue of the antioxidant, the adhesion to the magnetic layer can be improved, and by virtue of the above-mentioned monomer, oligomer or polymer, the adhesion or bonding strength can be made uniform, whereby abrasion due to fine irregularities is minimized, and a strong top coating layer will be formed. Thus, the magnetic recording layer will be free from receiving damages, the running properties under high temperature and high humidity conditions will be stabilized, the top coat abrasion will be minimized, and the frictional effects will be stabilized.

The magnetic recording medium of the present invention is useful as an audio tape, a video tape, a computer tape, an endless tape, a magnetic disc or a magnetic camera. Among such uses, it is particularly useful as a video tape, a computer tape and a video floppy disc, wherein the dropouts are one of the most critical properties.

By using a magnetic recording layer provided with a fine particulate pigment-containing top coating layer of the present invention whose surface roughness (R20) is adjusted to be less than 400 Å, and in which an antioxidant, a lubricant and an organic binder are incorporated, it is possible to obtain a high performance tape having excellent electromagnetic conversion characteristics and property dependability for a video cassette tape, and a master tape for contact transfer printing of a video tape, in which technical progress is particularly remarkable in recent years, and which enjoy an expansion of marketability, and for a 8 mm video cassette tape and a video floppy disc, which are expected to have an expanded market. Thus, the magnetic recording medium of the present invention is excellent and very useful.

Now, the present invention will be described in detail with reference to Examples. However, it should be understood that the present invention is by no means restricted by these specific Examples

EXAMPLES (1) Formation of magnetic layers Magnetic layer 1 (radiation curable magnetic layer)

|  | Parts by weight |
|---|---|
| Cobalt-adsorbed acicular $\gamma$-$Fe_2O_3$ (long axis: 0.4 $\mu$m, short axis: 0.05 $\mu$m, Hc: 600 Oe) | 120 |
| Carbon black (antistatic Mitsubishi Carbon Black MA-600) | 5 |
| $\alpha$-$Al_2O_3$ powder (particle size: 0.5 $\mu$m) | 2 |
| Dispersant (purified soybean lecithin) | 3 |
| Solvent (MEK/toluene: 50/50) | 100 |

The mixture having the above composition was mixed in a ball mill for 3 hours to adequately wet the acicular magnetic iron oxide with the dispersant.

Then, the following binder composition was thoroughly mixed and dissolved.

|  | Parts by weight |
|---|---|
| Acrylic double bond-introduced saturated polyester resin | 10 (as solid content) |
| Acrylic double bond-introduced vinyl chloride-vinyl acetate copolymer | 10 (as solid content) |
| Acrylic double bond-introduced polyether urethane elastomer | 10 (as solid content) |
| Solvent (MEK/toluene: 50/50) | 200 |
| Lubricant (higher fatty acid-modified silicone oil) | 3 |

The binder mixture was introduced into the ball mill wherein the magnetic powder was previously treated, and the mixture was again mixed and dispersed for 42 hours.

The magnetic coating material thus obtained was applied onto a polyester film having a thickness of 15 $\mu$m, and oriented on a parmanent magnet (1600 gauss). After evaporating the solvent by means of an infrared lamp or hot air, the coated film was subjected to surface smoothing treatment, and then electron beams were irradiated by means of an electro curtain-type electron beam accelerator manufactured by ESI Company at an acceleration voltage of 150 KeV at an electrode current of 20 mA and at a total dose of 5 Mrad in a nitrogen atmosphere, to cure the coating layer.

Magnetic layer 2

The following mixture was applied onto a polyester film in a thickness of 3.5 $\mu$m, followed by electron beam curing and calender treatment.

|  | Parts by weight |
|---|---|
| Fe—Co—Ni alloy powder (Hc = 1200 Oe, long axis: 0.4 $\mu$m, short axis: 0.05 $\mu$m, BET specific surface area: 52 $m^2$/g) | 100 |
| Vinyl chloride-vinyl acetate-vinyl alcohol copolymer (VAGH, manufactured by Union Carbide Co.) | 15 |
| Polyvinyl butyral resin | 10 |
| Acrylic double bond-introduced urethane | 10 |

| -continued | |
| --- | --- |
| | Parts by weight |
| Methyl ethyl ketone/toluene (50/50) | 250 |

Magnetic layer 3 (Ferromagnetic thin film 1)

A polyester film having a thickness of 12 μm was moved along the circumferential surface of a cylindrical cooling can, and an alloy comprising 80% of Co and 20% of Ni was melted and obliquely vapor deposited only at a portion having an angle of incidence of from 90° to 30°, in a chamber kept under a vacuum degree of $1.0 \times 10^{-4}$ Torr while circulating $O_2 + Ar$ (a volume ratio of 1:1) at a rate of 800 cc/min, whereby a Co-Ni-O thin film having a thickness of 0.15 μm was formed. Oxygen was localized at the interface with the base and at the surface on the opposite side of the base. The surface on the opposite side of the base was covered substantially solely by the oxide. Hc=1000 Oe. The average oxygen content in the thin film was 40% as the atomic ratio relative to Co and Ni ($O/CoNi \times 100$).

Magnetic layer 4 (Ferromagnetic thin film 2)

A polyester film having a thickness of 12 μm was moved along the circumferential surface of a cylindrical cooling can, and vapor deposition was conducted in the same manner as in the case of ferromagnetic thin film 1, in a chamber having a vacuum degree of $5.0 \times 10^{-6}$ Torr. The film thus formed had a thickness of 0.15 μm and consists substantially of Co-Ni.

This tape was forcibly oxidized in an atmosphere at 90° C. under relative humidity of 20%. The surface on the opposite side of the base was covered with the oxide. Hc=900 Oe. The average oxygen content in the thin film was 45% as the atomic ratio relative to Co and Ni.

Magnetic layer 5 (Ferromagnetic thin film 3)

In the same manner as in the case of ferromagnetic thin film 2 except that the step of oxidation with oxygen is omitted, a polyester film having a thickness of 12 μm was moved along the circumferential surface of a cylindrical cooling can, and vapor deposition was conducted in the same manner as in the case of ferromagnetic thin film 1, in a chamber having a vacuum degree of $5.0 \times 10^{-6}$ Torr. The film thus formed had a thickness of 0.15μm and consists substantially of Co-Ni. Hc=950 Oe.

(2) Formation of a top coating layer

Top coating compositions

| Top coating composition 1 | Part by weight |
| --- | --- |
| Dimethylaminoethyl methacrylate | 0.5k |
| Colloidal SiO2, particle size of 150Å | 0.001 |
| Fluorine-modified silicon stearate | 0.4k |
| MEK | 100 |

| Top coating composition 2 | Parts by weight |
| --- | --- |
| Stearyl (2) hydroxy acrylate phosphate (a mixture of mono and di) | 1 |
| TiO2 (Colloidal - prepared by method (1)) 100Å | 0.04 |
| Stearic acid acrylate | 0.5 |
| Myristyl myristilate | 0.1 |
| MEK/toluene (1/1) | 100 |

| Top coating composition 3 | |
| --- | --- |
| Hydroxy ethyl methacrylate phosphate | 1 |
| Cr2O3 (prepared by method (2), 180Å | 0.001 |
| Myristic acid | 0.2 |
| Toluene | 100 |

| Top coating composition 4 | Parts by weight |
| --- | --- |
| Dimethylaminoethyl methacrylate | 1.5 |
| Colloidal SiO2 (prepared by method (1)) 100Å | 0.01 |
| Phenoxy-modified product, Molecular weight 30,000 | 0.2 |
| Acryl-modified polyurethane elastomer Molecular weight 4,000 | 0.1 |
| Polyfunctional acrylate Molecular weight 500 | 0.1 |
| Stearic acid acrylate | 1 |
| MEK/toluene (1/1) | 100 |

| Top coating composition 5 | Parts by weight |
| --- | --- |
| Monoglycol salicylate acrylate | 2.5 |
| SiO2 (prepared by vapour phase method (2)) 100Å | 0.002 |
| Pentaerythritol tetracrylate Molecular weight 352 | 0.6 |
| N—vinyl pyrrolidone Molecular weight 111 | 0.3 |
| MEK/toluene (1/1) | 100 |

EXAMPLE 1 (Magnetic layer 1-top coating composition 1)

The concentration of a lacquer was adjusted with the ratio of dimethylaminoethyl methacrylate to fluorine-modified stearic acid silicone of 0.5 k:0.4 k, and a top coating layer was formed with a thickness of 600 Å. The surface roughness was adjusted by the coating method to obtain a roughness of from 10 to 600 Å.

The relation between the surface roughness and the properties is shown in Table 1. The results of a Comparative Example (Comparative 1) wherein no pigment was employed, are also shown in Table 1.

TABLE 1

| R20 | 10 | 20 | 50 | 150 | 200 | 300 | 400 | 600 | Comparative 1 |
| --- | --- | --- | --- | --- | --- | --- | --- | --- | --- |
| After 50 runs at 40° C. under a relative humidity of 80% | | | | | | | | | |
| Deposition to the head | Moderate | None | None | None | None | None | Slight | Substantial | Substantial |
| Clogging | Substantial | None | None | None | None | None | Slight | Substantial | Substantial |
| Output fluctuation | Slight | Slight | Slight | Slight | Slight | Moderate | Moderate | Substantial | Substantial |

TABLE 1-continued

| R20 | 10 | 20 | 50 | 150 | 200 | 300 | 400 | 600 | Comparative 1 |
|---|---|---|---|---|---|---|---|---|---|
| TC abrasion | Substantial | None | None | None | None | Slight | Slight | Substantial | Substantial |
| Surface roughening | Moderate | None | None | None | None | None | None | * | * |
| DO (number/min) | 300 | 40 | 40 | 40 | 40 | 50 | 70 | 500 | 1000 |
| Friction: | | | | | | | | | |
| Initial | 0.30 | 0.25 | 0.25 | 0.25 | 0.23 | 0.23 | 0.21 | 0.19 | 0.28 |
| After 50 runs | 0.52 | 0.32 | 0.32 | 0.30 | 0.26 | 0.26 | 0.30 | 0.50 | Stopped 10 times |

TC abrasion: Top coat abrasion, DO: dropouts
*Not measurable because of too much deposition The following facts are evident from Table 1.

1. In the $SiO_2$-containing top coating layer, $SiO_2$ is contained in an amount of 200,000 particles/100 $\mu m^2$ in the top coating layer, whereby satisfactory results are obtained with respect to the deposition to the head, clogging, output fluctuation, top coat abrasion, surface roughening, dropouts and friction.

2. In the case where R20 is less than 20 Å, the surface roughness is so small that the friction increases, and no adequate cleaning effects to the head are obtainable, whereby the adhesion to the head, clogging, output fluctuation, top coat abrasion and surface roughening and dropouts tend to increase.

3. When R20 is 400 Å or more, the surface roughness becomes poor (i.e. too great), whereby the top coat abrasion will result, and the deposition to the head, clogging, output fluctuation and dropouts tend to increase. Further, since the deposition to the heat and top coat abrasion are substantial, the friction after 50 runs tends to be great.

4. Thus, good results are obtainable when R20 is from 20 to less than 400 Å. From Table 1, it is evident that a preferred range is from 20 to 200 Å.

The same results as in Example 1 were obtained also with respect to the magnetic layers 2 and 3. With respect to the magnetic layers 2 and 3, the thickness of the top coating layer is preferably at most 450 Å in view of the electromagnetic conversion characteristics. Likewise, surface roughness is preferably at most 200 Å.

With respect to the magnetic layer 1, the magnetic powder is $\gamma$-$Fe_2O_3$ type, and the thickness of the top coating layer is preferably at most 800 Å, more preferably at most 450 Å, in view of the electromagnetic conversion characteristics.

EXAMPLE 2 (Magnetic layer 2-top coating composition 2)

The properties of the Example 2 having the above combination and Comparative Example 2 wherein no fine particulate pigment was employed, are shown in Table 2.

TABLE 2

| | Example 2 | Comparative Example 2 |
|---|---|---|
| After 30 runs at 20° C. under a relative humidity of 60% | | |
| Deposition to the head | None | Substantial |
| Clogging | None | Substantial |
| Level down | None | Substantial |
| TC abrasion | None | Substantial |
| Surface roughening | None | * |
| DO (number/min) | 20 | 900 |
| Friction: | | |
| Initial | 0.22 | 0.25 |
| After 50 runs | 0.26 | 0.55 |

TABLE 2-continued

| | Example 2 | Comparative Example 2 |
|---|---|---|
| R20 (Å) | 50 | 70 |

Note *Not measurable because of too much deposition

From Table 2, it is evident that the one containing the fine particulate pigment is excellent in all the properties. Whereas, the one containing no fine particulate pigment is poor in such properties since it has no cleaning effects for the head, and it is also evident that the friction after 50 runs is also inferior.

EXAMPLES 3, 4 and 5

The properties of the combinations of various magnetic layers and top coating layers are shown in Table 3. Comparative Example 3 corresponds to Example 3 except that the fine particulate pigment in the top coating composition 3 of Example 3 was omitted (top coating composition 3').

TABLE 3

| | Example 3 | Example 4 | Example 5 | Comparative Example 3 |
|---|---|---|---|---|
| Magnetic layer | 3 | 4 | 5 | 3 |
| Top coating composition | 3 | 4 | 5 | 3' |
| After 30 runs at 20° C. under a relative humidity of 60% | | | | |
| Deposition to the head | None | None | None | Substantial |
| Clogging | None | None | None | Substantial |
| Level down | None | None | None | Substantial |
| TC abrasion | Slight | None | None | Substantial |
| DO (number/min) | 100 | 80 | 80 | 1000 |
| After 30 runs at 40° C. under a relative humidity of 80% | | | | |
| Deposition to the head | Moderate | None | None | Twice stopped running |
| Clogging | Slight | None | None | |
| Level down | Slight | None | None | |
| TC abrasion | Moderate | Slight | Slight | |
| DO (number/min) | 200 | 100 | 100 | |
| R20 (Å) | 50 | 120 | 180 | 80 |

From Table 3, it is evident that the combinations of the present invention are superior to the Comparative Example. It is also evident that those containing a binder (Examples 4 and 5) exhibit particularly good results in the high temperature running at 40° C. under a relative humidity of 80%.

The molecular weights of the polymers and oligomers used in the present invention, are number average molecular weights obtained by the following measuring method.

Measurement of an average molecular weight of a binder by GPC

GPC (Gel Permeation Chromatography) is a method of separating molecules in a test sample depending upon their sizes in a mobile phase, wherein a porous gel functioning as a molecular sieve is filled in a column whereby liquid chromatography is conducted. For the calculation of an average molecular weight, a polystyrene having a known molecular weight is used as a standard sample, and a calibration curve is prepared based on its eluting time. An average molecular weight calculated as polystyrene is thereby obtained.

$$Mn = \frac{\Sigma NiMi}{\Sigma Ni}$$

where Mn is a number average molecular weight, and Ni is a number of molecules having a molecular weight of Mi in a given polymer substance.

The above-mentioned various characteristics were measured or evaluated as follows:

1. Surface roughness

The surface roughness was obtained by 20 point average method from the chart obtained by means of Talystep (manufactured by TAYLOR-HOBSON CO.). A cut off of 0.17 mm and a needle-pressure of $0.1 \times 2.5\mu$ were employed.

2. Clogging

A VHS deck was modified and adjusted to a condition where clogging is likely to result, and the measurement was conducted at various temperatures and humidity levels.

3. Dropouts

A VHS deck was modified and adjusted to a condition where dropouts are likely to result. A single signal 5 MHz was recorded and reproduced at various temperature and humidity levels, whereby a number of samples wherein reproduced signal lowers by at 18 dB from the average reproduced level for at least 15 micro seconds, were counted with respect to 10 samples for 1 minute each, and the average number was taken as dropouts.

4. Output fluctuations

The output fluctuations were also measured at the time of measuring the dropouts under item 2.

5. Deposition to the head, and top coat abrasion

A VHS deck was modified as mentioned above and operated for a predetermined number of times at various temperature and humidity levels whereby the deposition to the head and the top coat abrasion were examined by a microscopic photograph.

6. Average particle size and number of particles (a) The average particle size of the fine particulate pigment contained in the top coating layer was assumed as measured by a scanning electron microscope under conditions of an acceleration voltage of from 0.5K to 20KeV and from 10,000 to 100,000 magnifications, and 10 separate portions were examined with respect to a visual field of 100 $\mu m^2$. In some cases, particles were coagulated, and if the variation was substantial, the particle sizes of the primary particles were counted.

(b) Number of particles

Ten separate portions were examined with respect to a visual field of 100 $\mu m^2$, and the average number per 100 $\mu m^2$ was obtained.

What is claimed is:

1. A magnetic recording medium comprising a nonmagnetic substrate, a magnetic recording layer formed on the substrate, and a top coating layer formed on the magnetic recording layer, wherein the top coating layer contains a fine particulate pigment having a particle size less than 200 Å at its surface in an amount of from 15,000 to 1,000,000 particles/100 $\mu m^2$, and the surface roughness (R20) of the top coating layer is between 20 and less than 400 Å.

2. The magnetic recording medium according to claim 1, wherein the top coating layer contains an antioxidant.

3. The magnetic recording medium according to claim 2, wherein the antioxidant is of radiation curable type.

4. The magnetic recording medium according to claim 1, wherein the top coating layer contains at least one member selected from the group consisting of a monomer, an oligomer and a polymer.

5. The magnetic recording medium according to claim 1, wherein the top coating layer contains a lubricant.

6. The magnetic recording medium according to claim 1, wherein the magnetic recording layer is composed of a ferromagnetic alloy powder dispersed in a resin binder.

7. The magnetic recording medium according to claim 1, wherein the magnetic recording layer is composed of a ferromagnetic thin film.

* * * * *